US012122141B2

(12) United States Patent
Yokoi et al.

(10) Patent No.: US 12,122,141 B2
(45) Date of Patent: Oct. 22, 2024

(54) PRINTING DEVICE, PRINTING SYSTEM, AND FRAME EXCHANGING UNIT

(71) Applicant: FUJI CORPORATION, Chiryu (JP)

(72) Inventors: Yoshimune Yokoi, Kiyosu (JP); Takeshi Kondo, Chiryu (JP)

(73) Assignee: FUJI CORPORATION, Chiryu (JP)

( * ) Notice: Subject to any disclaimer, the term of this patent is extended or adjusted under 35 U.S.C. 154(b) by 0 days.

(21) Appl. No.: 18/263,824

(22) PCT Filed: Feb. 2, 2021

(86) PCT No.: PCT/JP2021/003678
§ 371 (c)(1),
(2) Date: Aug. 1, 2023

(87) PCT Pub. No.: WO2022/168145
PCT Pub. Date: Aug. 11, 2022

(65) Prior Publication Data
US 2024/0092075 A1 Mar. 21, 2024

(51) Int. Cl.
*B41F 15/12* (2006.01)
*B41F 15/34* (2006.01)

(52) U.S. Cl.
CPC .............. *B41F 15/12* (2013.01); *B41F 15/34* (2013.01)

(58) Field of Classification Search
None
See application file for complete search history.

(56) References Cited

U.S. PATENT DOCUMENTS

| | | | | |
|---|---|---|---|---|
| 2,206,176 A * | 7/1940 | Foard | B41F 15/00 | 101/126 |
| 2,610,577 A * | 9/1952 | Heintges | B41F 15/0845 | 101/115 |
| 5,107,760 A * | 4/1992 | Pratt | B41F 15/36 | 101/115 |
| 2019/0291410 A1 | 9/2019 | Yokoi et al. | | |
| 2019/0337290 A1 | 11/2019 | Hirukawa et al. | | |
| 2020/0001593 A1 | 1/2020 | Fukakusa et al. | | |
| 2020/0396843 A1* | 12/2020 | Losiewicz | B41M 1/12 | |

FOREIGN PATENT DOCUMENTS

| | | |
|---|---|---|
| JP | 4-197684 A | 7/1992 |
| JP | 7-314639 A | 12/1995 |
| WO | WO 2018/105016 A1 | 6/2018 |
| WO | WO 2018/105017 A1 | 6/2018 |
| WO | WO 2018/105018 A1 | 6/2018 |

OTHER PUBLICATIONS

International Search Report mailed on Apr. 20, 2021 in PCT/JP2021/003678 filed on Feb. 2, 2021, 2 pages.

* cited by examiner

*Primary Examiner* — Leslie J Evanisko
(74) *Attorney, Agent, or Firm* — Oblon, McClelland, Maier & Neustadt, L.L.P.

(57) ABSTRACT

A printing device includes a printing section configured to execute a printing process of a viscous fluid on a printing target using a screen mask, and a receiving section configured to receive an accommodation rack having multiple shelf sections for accommodating frames configured to support exchangeable members for a printing process that is executed at the printing section.

6 Claims, 7 Drawing Sheets

PRINTING DEVICE, PRINTING SYSTEM, AND FRAME EXCHANGING UNIT

TECHNICAL FIELD

The present description discloses a printing device, a printing system, and a frame exchanging unit.

BACKGROUND ART

Conventionally, there has been known, for example, a printing device for executing a printing process of a viscous fluid on a printing target such as a board using a screen mask in which exchangeable members for use in the printing device including screen masks is automatically exchanged. For example, Patent Literature 1 describes a printing device in which a printing device is installed in front of another printing device for an automatic exchange of exchangeable members between the printing device and the printing device.

PATENT LITERATURE

Patent Literature 1: International Publication 2018/105016

BRIEF SUMMARY

Technical Problem

In the printing device described above, however, for example, in the case that an automatic conveyance vehicle conveys exchangeable members such as screen masks for exchange of the exchangeable members at the printing device, there are needed at least two spaces of a space for complete separation of an exchangeable member from the automatic conveyance vehicle and a space for complete separation of an exchangeable member from an accommodation device, and the exchange is executed while adjusting the vertical position of the accommodating device, causing a problem in that much time is needed for the exchange.

The present disclosure has been made in view of the problem described above, and a main object of the present disclosure is to provide a printing device, a printing system, and a frame exchanging unit for exchanging exchangeable members for use in the printing device with good efficiency.

Solution to Problem

A printing device, a printing system, and a frame exchanging unit disclosed in the present description take the following means with a view to attaining the main object.

A printing device of the present disclosure includes:

a printing section configured to execute a printing process of a viscous fluid on a processing target using a screen mask; and a receiving section configured to receive an accommodation rack having multiple shelf sections for accommodating frames configured to support exchangeable members for a printing process that is executed at the printing section.

In this printing device, the accommodation rack is received which has the multiple shelf sections for accommodating the frames configured to support the exchangeable members for the printing process executed at the printing section. With this printing device, since the accommodation rack accommodating the multiple exchangeable members can be exchanged altogether, the exchangeable members can be exchanged more efficiently.

DESCRIPTION OF EMBODIMENTS

Figure 1:
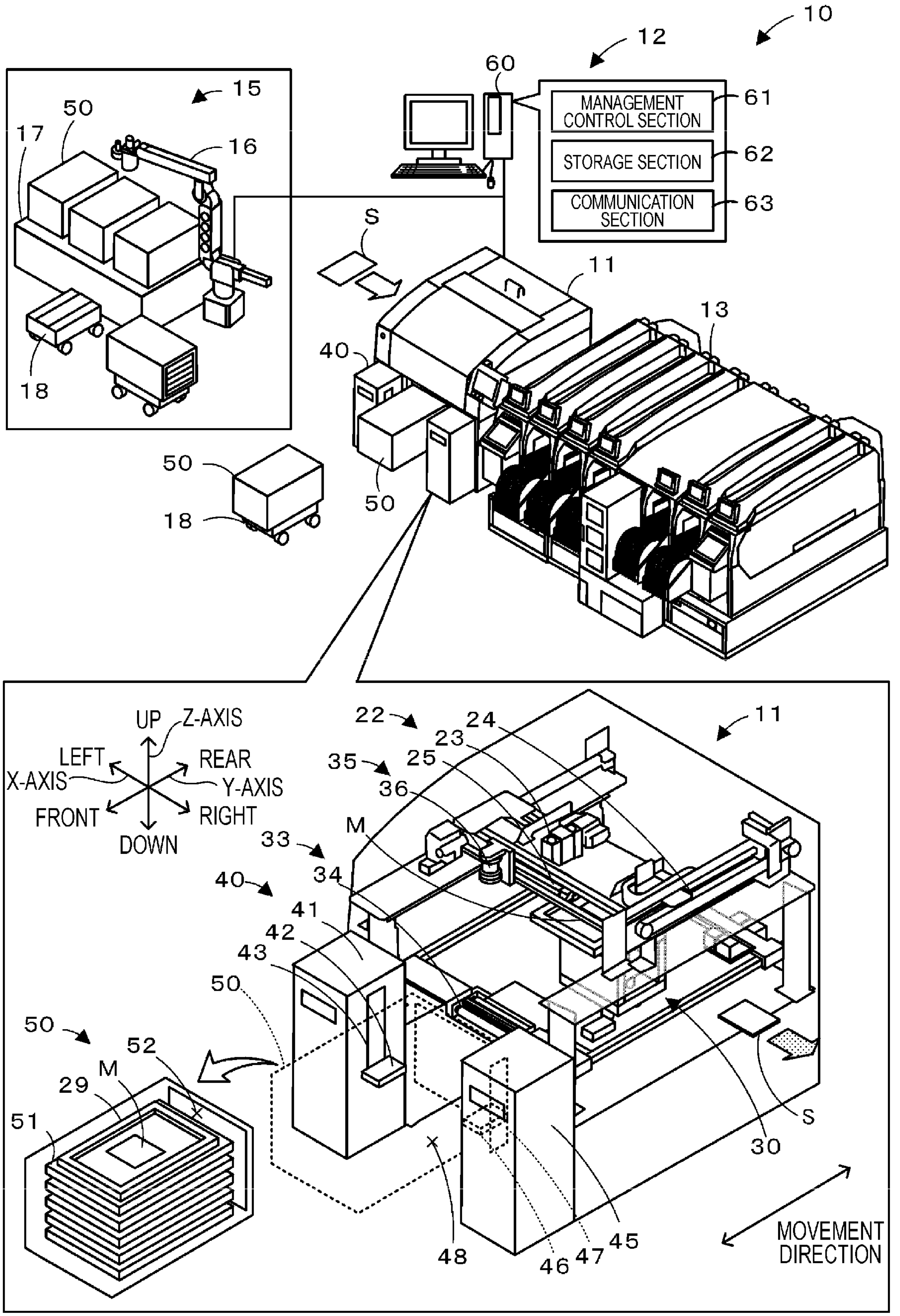
FIG. 1 is a schematic explanatory diagram illustrating an example of mounting system 10 and printing system 12.
Figure 2:
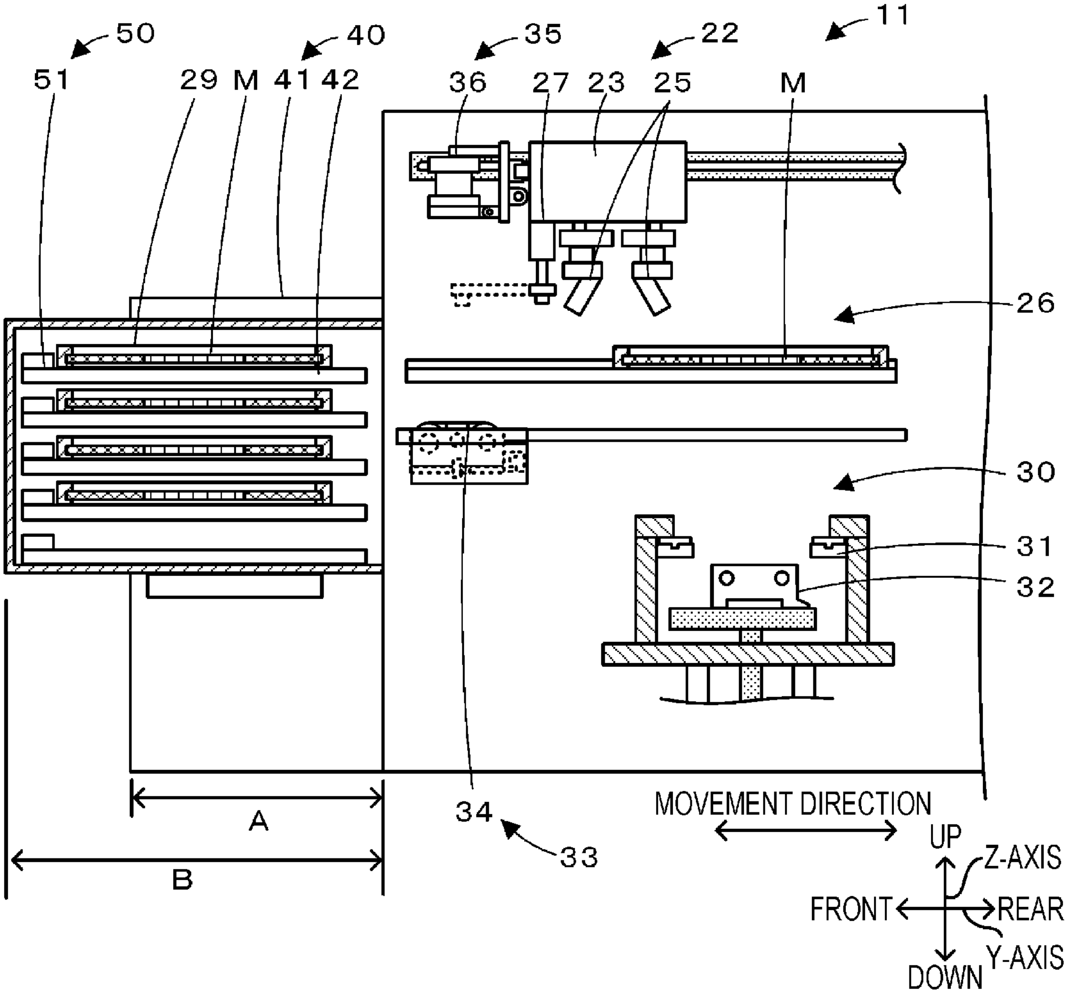
FIG. 2 is a schematic explanatory diagram of printing device 11, frame exchanging unit 40, and accommodation rack 50.
Figure 3:
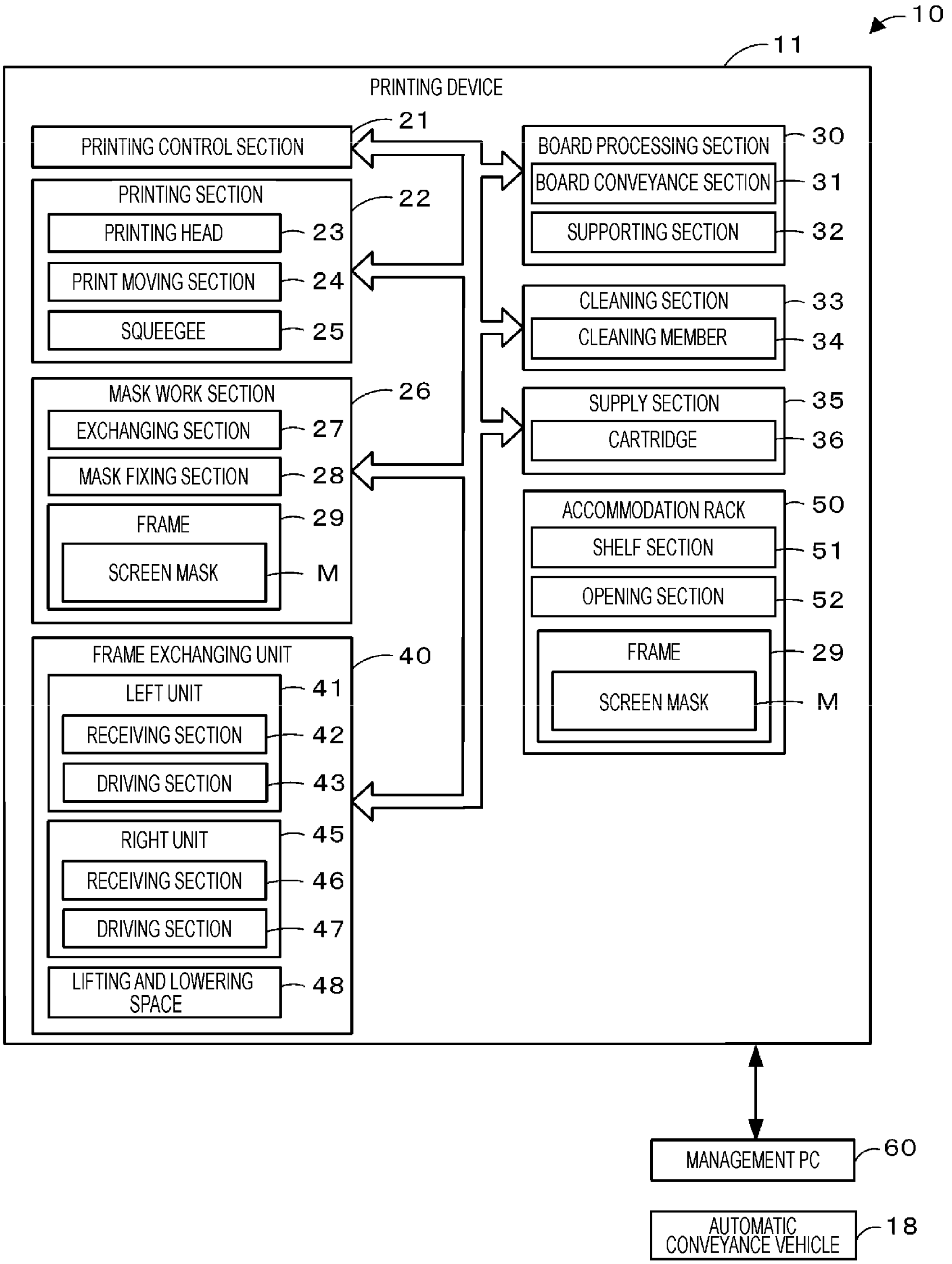
FIG. 3 is a block diagram showing an electrical connection relationship of mounting system 10.

Hereinafter, the present embodiment will be described while referring to drawings. FIG. 1 is a schematic explanatory diagram illustrating an example of mounting system 10 including printing device 11 constituting an example of the present disclosure and printing system 12. FIG. 2 is a schematic explanatory diagram of printing device 11, frame exchanging unit 40, and accommodation rack 50. FIG. 3 is a block diagram showing an electrical connection relationship of mounting system 10. Mounting system 10 is a system for mounting, for example, a component on board S as a processing target. Mounting system 10 includes printing device 11, mounting device 13, automatic conveyance vehicle 18, and management computer (PC) 60. Mounting system 10 is configured as a mounting line in which multiple mounting devices 13 for mounting a component on board S are arranged on a downstream side of printing device 11. Printing system 12 includes printing device 11 and management PC 60 functioning mainly to manage printing device 11. Here, in the present embodiment, a left-right direction (an X axis), front-rear direction (a Y axis), and an up-down direction (a Z axis) are as shown in FIGS. 1, 2, 5, and 6.

Warehouse area 15 is an area for preparing an exchangeable member (hereinafter, also simply referred to as a member) or the like for use in mounting system 10. There are raised as a member for use in mounting system 10, for example, in printing device 11, screen mask M, support member 32 for fixing a processing target, squeegee 25 for applying a solder paste as a viscous fluid in a printing process, cartridge 36 for accommodating a viscous fluid, cleaning member 34 for cleaning screen mask M, and the like. Arm robot 16 and preparation table 17 are disposed in this warehouse area 15. Arm robot 16 performs an operation of placing accommodation rack 50 prepared for subsequent use from preparation table 17 to automatic conveyance vehicle 18, and an operation of moving used accommodation rack 50 collected by automatic conveyance vehicle 18 to preparation table 17. Preparation table 17 is a working table on which new accommodation rack 50 and used accommodation rack 50 are placed. Arm robot 16 is controlled by a control PC, not shown. This control PC receives an exchange command from management PC 60 via a network line, and outputs information on a work status of arm robot 16 to management PC 60. In warehouse area 15, an operator may move and prepare accommodation rack 50.

Mounting device 13 is a device for mounting a component on board S on which a viscous fluid such as a solder paste or the like is printed by printing device 11.

Automatic conveyance vehicle 18 moves between warehouse area 15 for storing and preparing for use a member for use in a mounting process and the mounting line, and automatically conveys accommodation rack 50 accommodating, for example, members such as screen masks M. Frame exchanging unit 40 for receiving accommodation rack 50 is connected to printing device 11, and automatic conveyance vehicle 18 transfers accommodation rack 50 that has been conveyed thereby to frame exchanging unit 40. This automatic conveyance vehicle 18 may be AGV configured to move along a line formed on a floor surface or AMR configured to travel autonomously based on a signal obtained from a sensor, a camera, or the like. Automatic conveyance vehicle 18 includes a controller, a driving section, a communication section, and a placement section. The controller controls the whole of the device. The driving section is a motor for rotationally driving wheels, and is controlled by the controller. The communication section is a wireless interface configured to communicate with an external device such as printing device 11 or management PC 60. Automatic conveyance vehicle 18 transmits and receives commands and signals to and from management PC 60 and printing device 11 via this communication section. Automatic conveyance vehicle 18 has the placement section for placing a member such as accommodation rack 50 on an upper surface thereof. This automatic conveyance vehicle 18 enters lifting and lowering space 48 defined in the center of frame exchanging unit 40 to receive and transfer accommodation rack 50 from and to frame exchanging unit 40.

As shown in FIGS. 1 to 3, printing device 11 is a device for pushing a solder as a viscous fluid placed on screen mask M using squeegees 25 into a pattern hole formed in the screen mask M in question to thereby apply (print) the solder to board S as a processing target which lies below that screen mask M via the pattern hole. Here, as the "processing target", there are raised, for example, board S on which a component is to be mounted, a substrate which is a three-dimensional object, and the like. As the "viscous fluid", there are raised a solder paste or a conductive paste, an adhesive, and the like. Here, the following description will be made based on the understanding that the processing target is board S and the viscous fluid is solder. Screen mask M is fixed to an inner side of frame 29. Frame 29 is such that several kinds or sizes of screen masks M can be fixed thereto and is sized to be accommodated in shelf section 51 of accommodation rack 50 (refer to FIG. 1). As shown in FIG. 3, printing device 11 includes printing control section 21, printing section 22, mask work section 26, board processing section 30, cleaning section 33, supply section 35, and frame exchanging unit 40.

Printing control section 21 is configured as a microprocessor mainly including CPU, and controls the whole of printing device 11. Printing control section 21 outputs a signal to management PC 60 as an external device, printing section 22, mask work section 26, board processing section 30, cleaning section 33, supply section 35, and frame exchanging unit 40 and receives signals from these sections as inputs therefrom. For example, printing control section 21 outputs request information for requesting the movement of accommodation rack 50 to management PC 60 as a management device in accordance with a use state of exchangeable members in printing section 22. In addition, printing control section 21 receives a receipt signal notifying that accommodation rack 50 has been installed in frame exchanging unit 40 from automatic conveyance vehicle 18 as an input therefrom. Further, printing control section 21 causes exchanging section 27 to exchange screen masks M between accommodation rack 50 and printing section 22. This printing control section 21 has a storage section where to store information on board S on which a printing process is executed, a printing process program for executing a printing process on board S, a member exchanging process program for executing an exchanging process of frames 29 by exchanging section 27, and the like.

Figure 4:
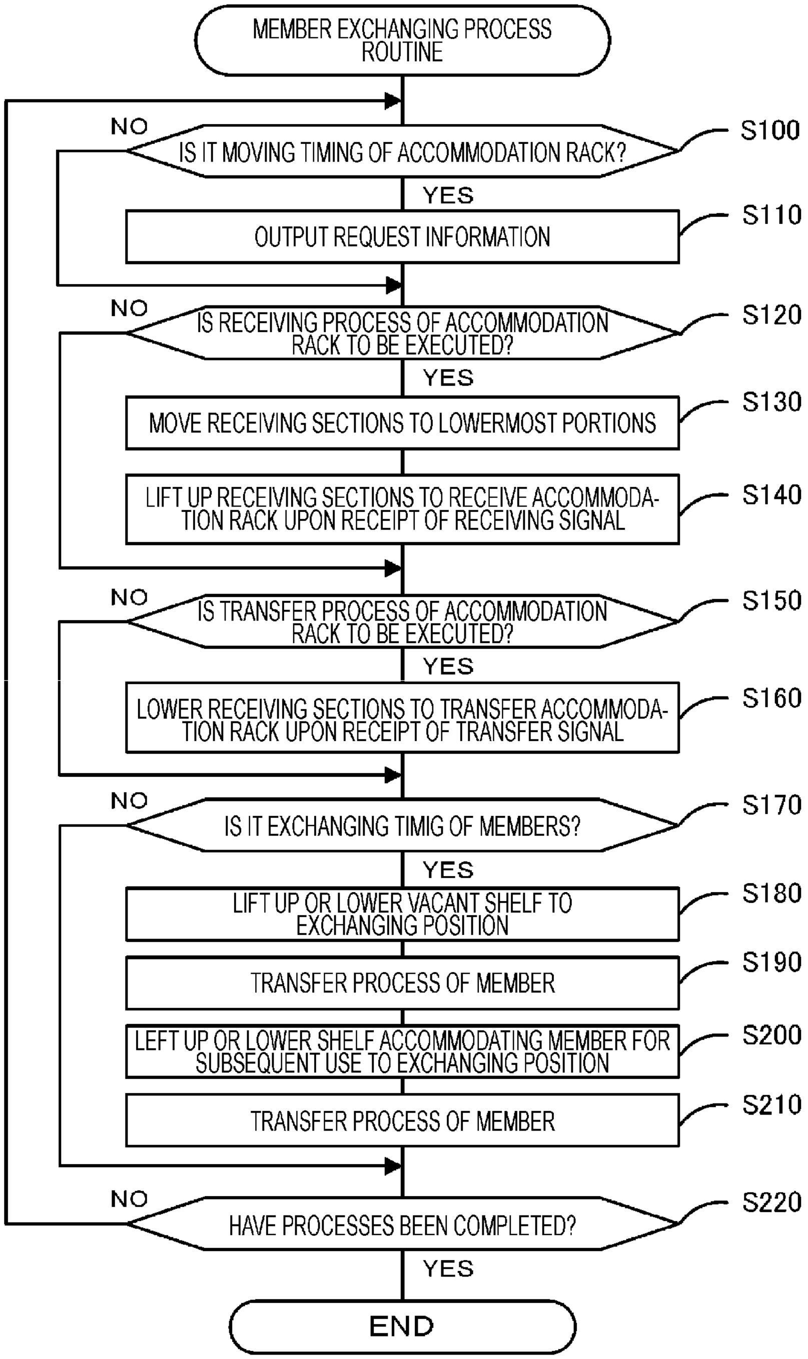
FIG. 4 is a flowchart showing an example of a member exchanging process routine.

Printing section 22 is a unit installed at an upper stage of printing device 11 and configured to execute a printing process of printing a viscous fluid on board S using screen mask M. As shown in FIGS. 1 and 4, printing section 22 includes printing head 23, print moving section 24, a squeegee lifting and lowering section, and squeegees 25. Print moving section 24 moves printing head 23 in a predetermined printing direction (here, the front-rear direction), and includes a guide formed in the front-rear direction, a slider configured to move along the guide, and a motor for driving the slider. Squeegee 25 is installed on a lower surface side of printing head 23 and is lifted and lowered by the squeegee lifting and lowering section. Printing section 22 has two squeegees 25 which are both used in the front-rear direction. Mask work section 26 is a unit installed between printing section 22 and board processing section 30 in the up-down direction as shown in FIG. 2 and configured to fixedly hold screen mask M. As shown in FIG. 3, mask work section 26 includes exchanging section 27 and mask fixing section 28. Exchanging section 27 is a conveyance rod provided on printing head 23 and is lowered to a position where it is brought into abutment with screen mask M by an air cylinder, not shown, and an abutting section thereof configured to be brought into abutment with frame 29 moves also in the front-rear direction as a result of being rotated (refer to dashed lines in FIG. 2). Printing head 23 and exchanging section 27 are brought into engagement with frame 29 between shelf section 51 in accommodation rack 50 which is positioned at a predetermined height and printing section 22 so as to move frame 29. Mask fixing section 28 positions and fixedly supports screen mask M in a horizontal posture. Screen mask M is pushed by exchanging section 27 so as to be moved in the front-rear direction along the guide of mask work section 26 and is fixed in place by mask fixing section 28. As shown in FIG. 2, board processing section 30 is a unit installed below mask work section 26 and configured to convey in board S, position conveyed board S in for support, and move that board S towards screen mask M for contact and away from the screen mask M. Board processing section 30 includes board conveyance section 31 for conveying board S in the left-right direction, support member 32 for supporting board S from below, and a board lifting and lowering section for lifting and lowering the whole of board processing section 30 and support member 32. Cleaning section 33 is a unit installed between mask work section 26 and board processing section 30 in the up-down direction and configured to execute a cleaning process of cleaning a rear face of screen mask M. Cleaning section 33 has cleaning member 34 and cleans screen mask M with cleaning member 34. Supply section 35 is a unit for supplying a solder accommodated in cartridge 36 on to screen mask M. Supply section 35 is installed ahead of printing head 23. Supply section 35 applies a pressure to cartridge 36 so as to discharge the solder from cartridge 36. Cleaning member 34 and cartridge 36 are consumables and are exchanged as required.

Frame exchanging unit 40 is configured as a device for receiving accommodation rack 50 accommodating exchangeable members such as screen mask M fixed to frame 29 and lifting and lowering accommodation rack 50. Frame exchanging unit 40 includes left unit 41 and right unit 45 which function as the lifting and lowering section of the present disclosure. In addition, left unit 41 and right unit 45 have receiving section 42 and receiving section 46, respectively, where accommodation rack 50 is received. Left unit 41 is installed at a front left side of a housing of printing device 11. Right unit 45 is installed at a front right side of the housing of printing device 11. These left unit 41 and right unit 45 are formed such that length A along a movement direction of frame 29 is shorter than length B of accommodation rack 50 (refer to FIG. 2). This frame exchanging unit 40 has lifting and lowering space 48 where to lift and lower accommodation rack 50 in the center between left unit 41 and right unit 45. Left unit 41 includes receiving section 42 and driving section 43. Right unit 45 includes receiving section 46 and driving section 47. Receiving section 42 receives accommodation rack 50 accommodating frames 29 for supporting screen masks M and supports this accommodation rack 50 from a lower surface side thereof. Receiving section 42 may fix accommodation rack 50 by means of, for example, a magnetic force or the like. Driving section 43 is configured to lift and lower accommodation rack 50 by lifting and lowering receiving section 42. This driving section 43 may be such as to have a ball screw having a lifting and lowering shaft and a driving motor or may be a linear motor. Here, since receiving section 46 and driving section 47 are the same as receiving section 42 and driving section 43, the description thereof will be omitted.

Accommodation rack 50 is an accommodation body for accommodating frames 29 which can support screen masks M as exchangeable members for a printing process that is executed at printing section 22. This accommodation rack 50 has multiple shelf sections 51 and one opening section 52. Shelf sections 51 are installed in such a manner as to be aligned at predetermined intervals in the up-down direction so as to enable frames 29 supporting screen mask M to be placed thereon in the up-down direction. In addition, opening section 52 communicates with an outside such as printing section 22, and frame 29 is conveyed in and out through opening section 52. Accommodation rack 50 has no driving section for moving frame 29. With this accommodation rack 50, the configuration can be simplified more. Shelf section 51 has a size which can correspond to sizes of frames for exchangeable members of various types. That is, shelf section 51 is formed in a size capable of accommodating largest frame 29. This accommodation rack 50 may be accommodation rack 50 having shelf sections 51 corresponding individually to sizes of frames for exchangeable members of various types or may be accommodation rack 50 having multiple shelf sections 51 all having the same size. In the case of accommodation rack 50 having the latter configuration, multiple accommodation racks 50 having the same external size may be prepared, so that shelf sections 51 of each accommodation rack 50 correspond to any one of sizes of frames for exchangeable members of various types. In this case, although the number of types of accommodation rack 50 increases, since the external sizes of multiple accommodation racks 50 are the same, even in the case that sizes of frames for exchangeable members which are dealt with differ, multiple accommodation racks 50 in question can share receiving portions 42, 46.

Management PC 60 is a device for managing information on the individual constituent devices of mounting system 10. This management PC 60 includes management control section 61, storage section 62, and communication section 63. Management control section 61 is configured as a microprocessor mainly including CPU, and controls the whole of the device. Upon acquisition of request information for requesting the movement of accommodation rack 50 from printing device 11, management control section 61 outputs a command to cause automatic conveyance vehicle 18 for conveying accommodation rack 50 to move accommodation rack 50 to the control PC or automatic conveyance vehicle 18 in warehouse area 15. Storage section 62 is a large-capacity storage medium such as HDD or a flash memory, and manages the progress status of each device on the mounting line, a member which is being conveyed by automatic conveyance vehicle 18 or the current position of automatic conveyance vehicle 18, and the like. Communication section 63 is an interface for use in communication with an external device. Each device of mounting system 10 exchanges information with management PC 60 via communication section 63.

Firstly, a printing process executed by printing device 11 configured as described above will be described. A printing process routine for executing a printing process is stored in the storage section of printing control section 21 and is executed after printing control section 21 receives an execution command to execute a printing process as an input from the operator. When the printing process routine is started, the CPU of printing control section 21 first causes board processing section 30 to convey, fix and lift board S to thereby execute a process of bringing that board S into abutment with screen mask M. As this occurs, the CPU causes mask work section 26 to adjust the position of screen mask M for a position alignment between a pattern hole and board S. Subsequently, the CPU moves cartridge 36 to above screen mask M and then causes the cartridge 36 to discharge the solder stored therein. Subsequently, the CPU not only moves printing head 23 but also lowers squeegees 25 so as to bring squeegees 25 into abutment with an upper surface of the screen mask M and then moves squeegees 25 in the front-rear direction so as to apply the solder on to board S. In this way, printing control section 21 executes the printing process including the board conveyance and fixation process, the solder supply process, and the squeegee moving process to thereby execute printing on board S. The CPU repeatedly executes this printing process while exchanging screen masks M until the production process of producing all types of boards S described in a production plan is completed.

Next, operations performed by printing device 11 for frame exchanging unit 40 will be described. FIG. 4 is a flowchart showing an example of a member exchanging process routine executed by printing control section 21 of printing device 11. This routine is stored in the storage section of printing control section 21 and is executed after printing device 11 is activated. If this routine is executed, the CPU of printing control section 21 determines whether it is a moving timing of accommodation rack 50 (S100). The CPU determines that it is a moving timing of accommodation rack 50 when accommodation rack 50 is moved from warehouse area 15 to frame exchanging unit 40, for example, in such a state that no accommodation rack 50 is installed in frame exchanging unit 40 or when accommodation rack 50 is moved from frame exchanging unit 40 to warehouse area 15, for example, in such a state that all screen masks M accommodated in that accommodation rack 50 have been used up. If the CPU determines that it is a moving timing of accommodation rack 50, the CPU outputs request information for requesting the movement of accommodation rack 50 to management PC 60 (S110). Upon acquisition of the request information, management PC 60 transmits a command to move accommodation rack 50 to the control PC or automatic conveyance vehicle 18 in warehouse area 15. In response to the request, automatic conveyance vehicle 18 moves accommodation rack 50 between frame exchanging unit 40 and warehouse area 15.

After S110 or if the CPU determines in S100 that it is not a moving timing of accommodation rack 50, the CPU determines whether a receiving process in which frame exchanging unit 40 receives accommodation rack 50 from automatic conveyance vehicle 18 is to be executed (S120). The CPU determines that the receiving process is to be executed when no accommodation rack 50 exists in frame exchanging unit 40 and after request information is outputted. On the other hand, the CPU determines that the receiving process is not to be executed when accommodation rack 50 exists in frame exchanging unit 40. For execution of the receiving process, the CPU drives driving sections 43, 47 so as to move receiving sections 42, 46 to the lowermost portions respectively (S130). When automatic conveyance vehicle 18 moves to the front of frame exchanging unit 40 with accommodation rack 50 placed thereon, automatic conveyance vehicle 18 inserts accommodation rack 50 in lifting and lowering space 48 and transmits a receipt signal to printing control section 21. Upon acquisition of the receipt signal from automatic conveyance vehicle 18, the CPU determines that accommodation rack 50 exists in a receiving position in frame exchanging unit 40 and causes receiving sections 42, 46 to be lifted, so that accommodation rack 50 is received in frame exchanging unit 40 (S140). For example, the CPU may be configured to specify accommodation rack 50 received in frame exchanging unit 40 by reading an identifier affixed to accommodation rack 50 so received by a reading section not shown.

Figure 5A:
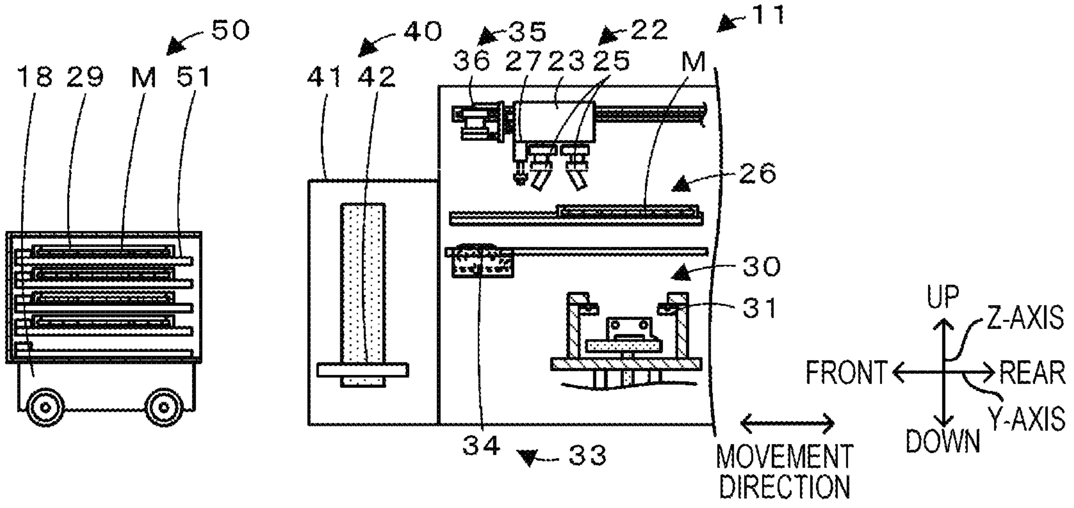
FIGS. 5A-5C are explanatory diagrams illustrating receipt of accommodation rack 50 by frame exchanging unit 40.
Figure 5B:
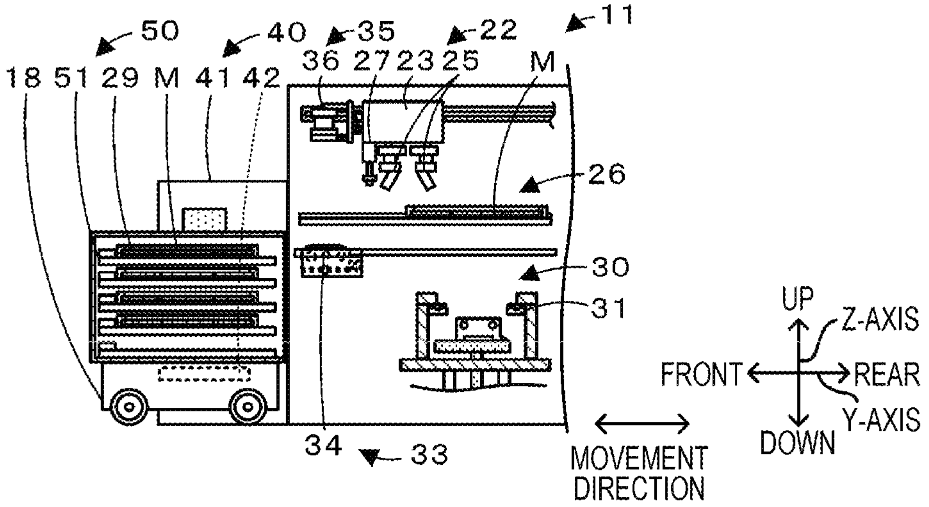
Figure 5C:
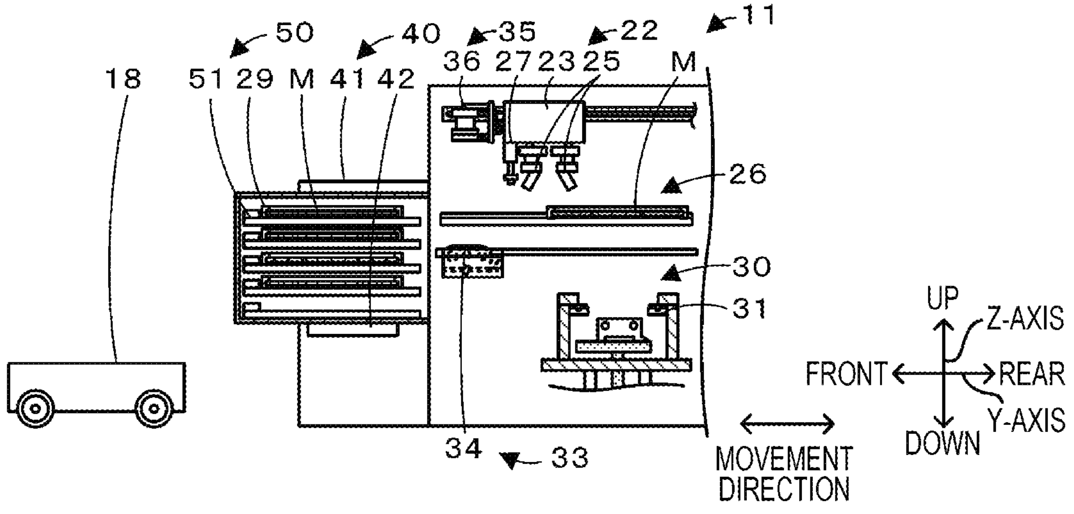

FIG. 5 is an explanatory diagram showing an example of receiving accommodation rack 50 by frame exchanging unit 40, in which FIG. 5A is a diagram showing a state in which accommodation rack 50 is waiting to be received (S130), FIG. 5B is a diagram showing a state in which accommodation rack 50 is inserted into lifting and lowering space 48, and FIG. 5C is a diagram showing a state in which accommodation rack 50 is received accordingly (S140). Printing device 11 causes receiving sections 42, 46 of frame exchanging unit 40 to move to the lowermost portions (FIG. 5A), and causes receiving sections 42, 46 to be lifted up when automatic conveyance vehicle 18 inserts accommodation rack 50 into lifting and lowering space 48 (FIG. 5B) to thereby receive accommodation rack 50 (FIG. 5C). In this way, printing device 11 receives accommodation rack 50.

After S140 or after the CPU determines in S120 that no receiving process is to be executed, the CPU determines whether a transfer process of transferring accommodation rack 50 from frame exchanging unit 40 to automatic conveyance vehicle 18 is to be executed (S150). The CPU determines that the transfer process is to be executed when accommodation rack 50 accommodating only screen masks M that have been used up exists in frame exchanging unit 40. On the other hand, the CPU determines that no transfer process is to be executed when accommodation rack 50 staying in frame exchanging unit 40 accommodates frames 29 for use for a subsequent printing process or when no accommodation rack 50 exists in frame exchanging unit 40.

In execution of the transfer process, the CPU waits until it receives a transfer signal from automatic conveyance vehicle 18, and upon receipt of a transfer signal, determining that automatic conveyance vehicle 18 arrives at lifting and lowering space 48, the CPU drives driving sections 43, 47 so as to cause them to move corresponding receiving sections 42, 46 to the lowermost portions, causing accommodation rack 50 to be transferred from frame exchanging unit 40 to automatic conveyance vehicle 18 (S160). Automatic conveyance vehicle 18 then moves accommodation rack 50 placed thereon to warehouse area 15. Here, in the transfer process, as shown in FIG. 5, printing device 11 waits for automatic conveyance vehicle 18 to arrive (FIG. 5C), moves receiving sections 42, 46 of frame exchanging unit 40 to the lowermost portions (FIG. 5A) when automatic conveyance vehicle 18 enters lifting and lowering space 48 (FIG. 5B), and transfers accommodation rack 50 to automatic conveyance vehicle 18.

Figure 6A:
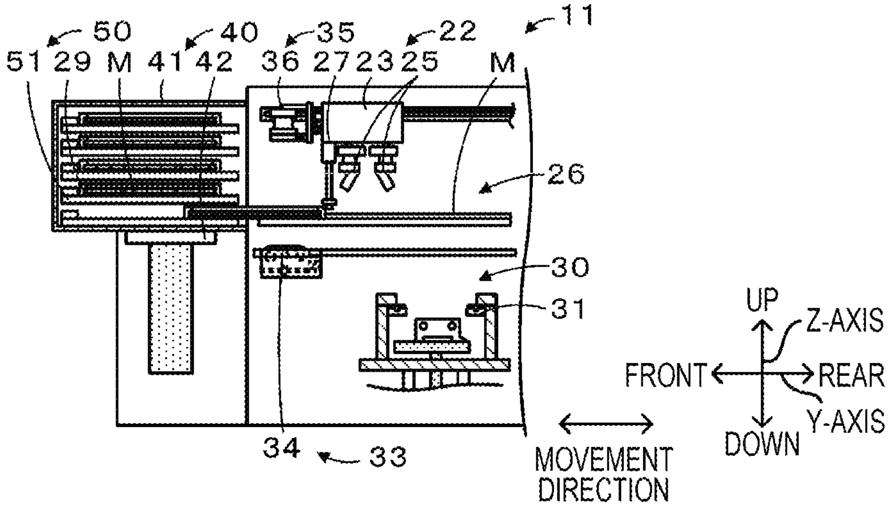
FIGS. 6A-6C are explanatory diagrams illustrating an example of exchange of screen masks M.
Figure 6B:
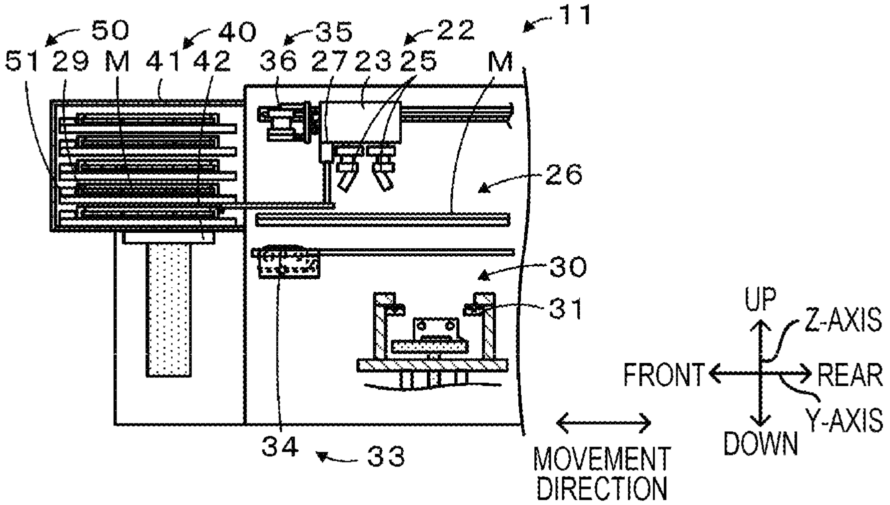
Figure 6C:
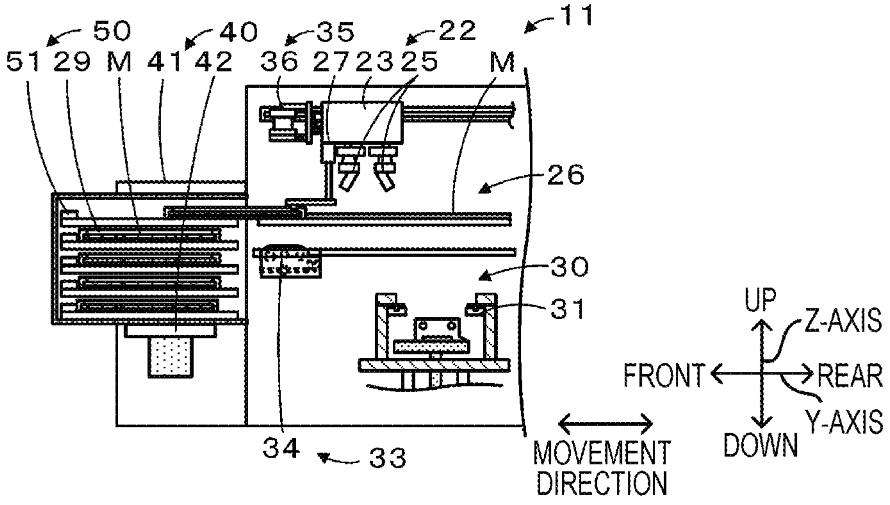

After S160 or after the CPU determines in S150 that no transfer process is to be executed, the CPU determines whether it is a timing when screen masks M, which are exchangeable members, are exchanged (S170). The CPU determines that it is an exchanging timing when screen masks M existing in printing section 22 have been used completely. If the CPU determines that it is an exchanging timing, the CPU executes an exchanging process of members. FIG. 6 is an explanatory diagram illustrating an example of exchanging screen masks M between printing section 22 and accommodation rack 50, in which FIG. 6A is a diagram showing a state in which frames 29 are transferred out into vacant shelf sections 51, FIG. 6B is a diagram showing a state in which frames 29 are inserted into shelf sections 51, and FIG. 6C is a diagram showing a state in which frames 29 are conveyed in from shelf sections 51. In the exchanging process, firstly, the CPU drives driving sections 43, 47 so as to cause them to lift up or lower accommodation rack 50 to position vacant shelf section 51 in an exchanging position at a predetermined height (S180). Subsequently, the CPU executes a convey-out process of moving screen masks M staying in printing section 22 to vacant shelf sections 51 (S190). In the convey-out process, the CPU lowers the abutting section of exchanging section 27 so that the abutting section comes into abutment with an edge portion of frame 29 so as to move printing head 23 to the front by means of print moving section 24 (FIG. 6A), and causes frame 29 to move into shelf section 51 by, for example, rotating exchanging section 27 (FIG. 6B). Subsequently, the CPU drives driving sections 43, 47 so as to cause them to lift up or lower accommodation rack 50 to position shelf section 51 installing screen mask M for a subsequent use in an exchanging position at a predetermined height (S200). Then, the CPU executes a convey-in process of moving screen mask M residing in shelf section 51 into printing section 22 (S210). In the convey-in process, the CPU lowers and rotates the abutting section of exchanging section 27 so that the abutting section comes into engagement with an edge portion of frame 29, causes print moving section 24 to move printing head 23 to the rear, and causes that frame 29 to move into printing section 22 by, for example, rotating exchanging section 27 (FIG. 6C). Here, the CPU may be configured to specify screen mask M conveyed into printing section 22 by reading an identifier affixed to frame 29 by a reading section not shown.

After S210, or if the CPU determines in S170 that it is not an exchanging timing of members, the CPU determines whether all printing processes of printing device 11 have been completed (S220), and if the CPU determines that the printing processes have not yet been completed, the CPU executes the processing from S100 onward. On the other hand, if the CPU determines in S220 that all the printing processes have been completed, the routine ends.

Here, a correspondence relationship between the constituent elements of the present embodiment and constituent elements of the present disclosure will be clarified. Printing section 22 of the present embodiment corresponds to a printing section, receiving sections 42, 46 correspond to a receiving section, left unit 41 and right unit 45 correspond to a lifting and lowering section, exchanging section 27 corresponds to an exchanging section, and printing control section 21 corresponds to a printing control section. In addition, printing system 12 corresponds to a printing system, frame exchanging unit 40 corresponds to a frame exchanging unit, management PC 60 corresponds to a management device, and management control section 61 corresponds to a management control section.

Figure 8:
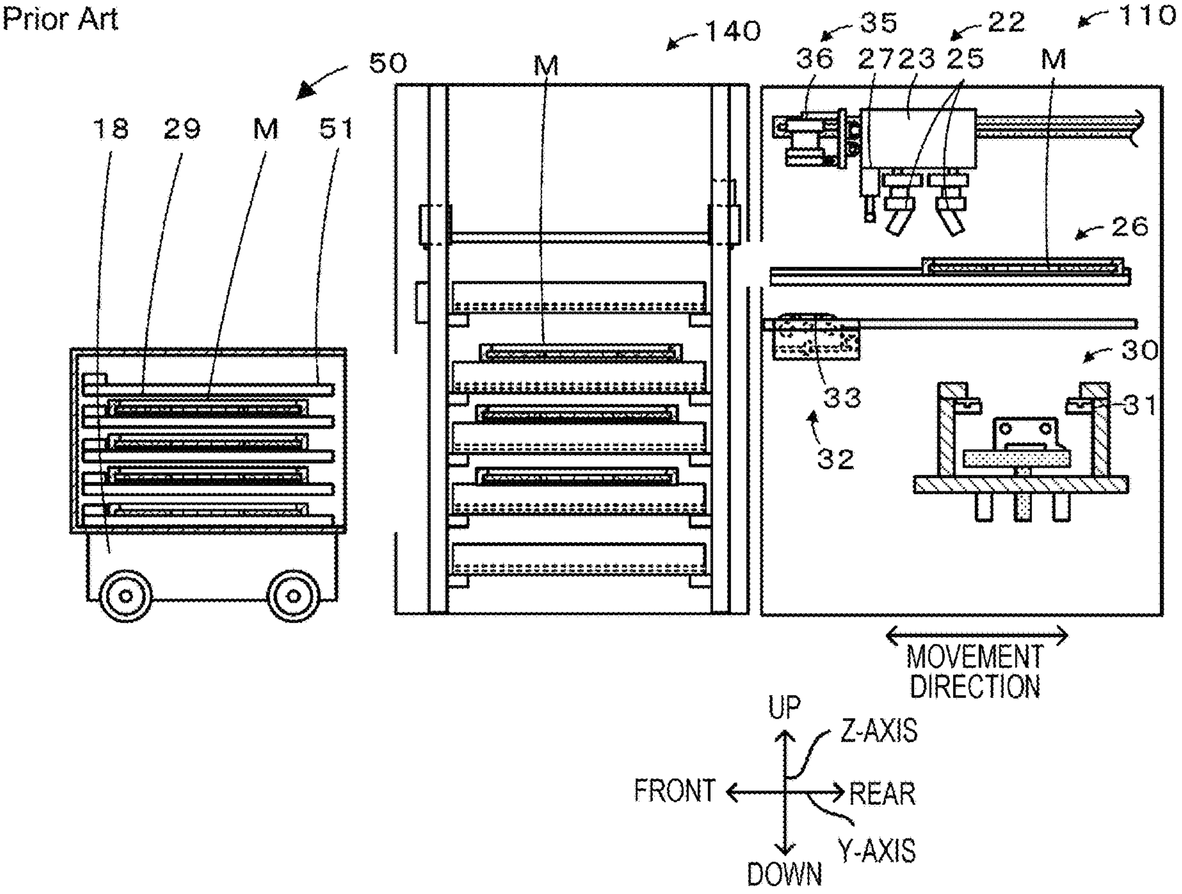
Fig. 8 Prior Art
FIG. 8 is an explanatory diagram illustrating an example of printing device 110 including storage device 140.

Printing device 11 of the present embodiment that has been described heretofore includes printing section 22 configured to execute the printing process of the solder paste as the viscous fluid on board S as the processing target using screen mask M as the exchangeable member for use in the printing process executed in printing section 22, and receiving sections 42, 46 configured to receive accommodation rack 50 having multiple shelf sections 51 accommodating frames 29 configured to support screen masks M. FIG. 8 is an explanatory diagram illustrating an example of printing device 110 including storage device 140. Printing device 110 is configured such that storage device 140 is configured to accommodate multiple exchangeable members and that frames 29 to which exchangeable members are fixed are conveyed into storage device 140 from automatic conveyance vehicle 18 or printing section 22 and are conveyed out from storage device 140 on to automatic conveyance vehicle 18 or printing section 22. Storage device 140 has a moving mechanism for moving frames 29 and a lifting and lowering mechanism for moving shelf sections 51 vertically. With this printing device 110, in the case that automatic conveyance vehicle 18 conveys exchangeable members for exchange of exchangeable members to and from printing section 22, there are needed at least two spaces of a space for frame 29 to be separated apart from automatic conveyance vehicle 18 completely and a space for frame 29 to be separated apart from storage device 140 completely, and hence, the space efficiency is not good. In addition, with printing device 110, exchangeable members are exchanged while adjusting the vertical position by storage device 140, resulting in, for example, a problem in that much time is needed for exchange. In this regard, with printing device 11, since entire accommodation rack 50 accommodating multiple exchangeable members can be exchanged, the space needed for exchange can be reduced further, thereby making it possible to provide good space efficiency. Further, with printing device 11, since frames 29 do not have to be exchanged one by one, good exchanging time efficiency can be provided. In this way, with printing device 11, exchangeable members can be exchanged more efficiently.

In addition, since printing device 11 includes left unit 41 and right unit 45 which function as the lifting and lowering section for lifting and lowering accommodation rack 50, exchangeable members can be exchanged by lifting up and lowering entire accommodation rack 50 by means of the lifting and lowering section. Further, in printing device 11, the lifting and lowering section is formed such that length A along the movement direction is shorter than length B of accommodation rack 50. With this printing device 11, the size of the device can be made more compact with accommodation rack 50 detached. In addition, with printing device 11, the lifting and lowering section includes left unit 41 installed on the left side of the housing and right unit 45 installed on the right side of the housing of printing device 11, and lifting and lowering space 48 where accommodation rack 50 is lifted up and lowered is provided in the center of the lifting and lowering section. With this printing device 11, since accommodation rack 50 is inserted into lifting and lowering space 48 defined between the lifting and lowering sections for exchange of accommodation racks 50, the exchange of accommodation racks 50 is facilitated.

Printing device 11 includes exchanging section 27 for moving frame 29 between shelf section 51 of accommodation rack 50 which is positioned at the predetermined height and printing section 22. With this printing device 11, exchangeable members can be exchanged by exchanging section 27. With printing device 11, since exchanging section 27 constitutes a mechanism configured to be brought into engagement with frame 29 so as to move an exchangeable member, printing device 11 can be configured relatively simple.

In addition, printing device 11 includes exchanging section 27 for moving frame 29 between shelf section 51 of accommodation rack 50 which is positioned at the predetermined height and printing section 22 and printing control section 21 for controlling printing section 22 and exchanging section 27. With this printing device 11, an automatic exchange of exchangeable members can be executed by printing control section 21 using exchanging section 27. Printing device 11 includes the lifting and lowering sections for lifting and lowering accommodation rack 50, and exchanging section 27 for moving frame 29, and when there exists frame 29 supporting used screen mask M in printing section 22, printing control section 21 causes the lifting and lowering sections and the exchanging section 27 to lift up or lower accommodation rack 50, to move frame 29 supporting the used screen mask M into vacant shelf section 51 of accommodation rack 50, and to move frame 29 supporting screen mask M for a subsequent use into printing section 22. With this printing device 11, exchangeable members can be exchanged more reliably. Additionally, with printing device 11, printing control section 21 outputs request information for requesting the movement of accommodation rack 50 in accordance with the use state of exchangeable members at printing section 22 to management PC 60 as the management device for managing printing device 11. With this printing device 11, the exchange of accommodation racks 50 can be executed more smoothly via management PC 60.

Accommodation rack 50 has multiple shelf sections 51 configured to install frames 29 supporting an exchangeable member in such a manner as to be placed in the up-down direction and opening section 52 which communicates with printing section 22. With this printing device 11, exchangeable members can be exchanged more efficiently via opening section 52 by receiving accommodation rack 50 accommodating exchangeable members in the up-down direction using shelf sections 51 into printing device 11. In addition, since accommodation rack 50 has no driving section, the configuration of the device can be simplified more. With this printing device 11, since accommodation rack 50 has shelf sections 51 corresponding to frames of various sizes for various types of exchangeable members, printing device 11 can deal with various types of exchangeable members while reducing the number of types of accommodation racks 50 by using single-type general purpose accommodation rack 50.

Printing system 12 includes printing device 11 described above, and management PC 60 as the management device including management control section 61 for managing information on printing device 11. With this printing system 12, as in the case with printing device 11 described above, since entire accommodation rack 50 accommodating multiple exchangeable members can be exchanged, exchangeable members can be exchanged more efficiently. Upon acquisition of request information for requesting the movement of accommodation rack 50 from printing device 11, management control section 61 outputs a command to move accommodation rack 50 to automatic conveyance vehicle 18 for conveying accommodation rack 50 to and from printing device 11. With this printing system 12, since accommodation rack 50 can be moved to printing device 11 by means of automatic conveyance vehicle 18, exchangeable members can be exchanged more smoothly.

Frame exchanging unit 40 is provided on printing device 11 including printing section 22 for executing the printing process of the viscous fluid on board S as the processing target using screen mask M, and has the lifting and lowering sections for lifting and lowering accommodation rack 50 having multiple shelf sections 51 accommodating frames 29 configured to support exchangeable members for use in printing device 11. With this frame exchanging unit 40, exchangeable members can be exchanged by lifting and lowering entire accommodation rack 50 by the lifting and lowering sections, and therefore exchangeable members can be exchanged more efficiently.

Here, the storage device and the printing system of the present disclosure are not limited to those described in the embodiment at all, and hence, it goes without saying that the accommodation device and the printing system can be executed in various forms without departing from the scope of the present disclosure.

For example, in the embodiment described above, printing device 11 is described as including frame exchanging unit 40 having the lifting and lowering sections; however, as long as printing device 11 includes a receiving section for receiving accommodation rack 50, printing device 11 need not have the lifting and lowering sections. In the embodiment described above, printing device 11 is described as having exchanging section 27; however, exchanging section 27 may be omitted. In the embodiment described above, printing device 11 is described as having printing control section 21; however, printing control section 21 may be omitted.

In the embodiment described above, frame exchanging unit 40 is described as being formed such that length A along the movement direction of frame 29 is shorter than length B of accommodation rack 50; however, the present disclosure is not particularly limited thereto. Here, since the printing process can be executed even though accommodation rack 50 is detached, frame exchanging unit 40 is preferably configured such that length A is shorter than length B, whereby the device can be made compact in size.

In the embodiment described above, frame exchanging unit 40 is described as including left unit 41 and right unit 45 so that the main bodies of frame exchanging unit 40 are disposed individually at the left and right of the housing of printing device 11; however, the present disclosure is not limited thereto, and hence, as long as a space for accommodating accommodation rack 50 is provided, frame exchanging unit 40 may be formed into an integrated structure. In addition, frame exchanging unit 40 is described as being installed ahead of printing device 11; however, the present disclosure is not particularly limited thereto, and hence, frame exchanging unit 40 may be installed to the rear or side of printing device 11.

In the embodiment described above, receiving sections 42, 46 are described as receiving accommodation rack 50 by supporting the left and right end portions of accommodation rack 50 from the lower surface side; however, the present disclosure is not particularly limited thereto as long as accommodation rack 50 can be received accordingly, and hence, for example, receiving sections 42, 46 may be configured to support the whole of a lower surface of accommodation rack 50, or may be configured to receive accommodation rack 50 by supporting accommodation rack 50 from side surfaces or an upper surface of accommodation rack 50. In addition, in the embodiment described above, frame exchanging unit 40 is described as receiving accommodation rack 50 from automatic conveyance vehicle 18 by lifting up accommodation rack 50 upwards and transferring accommodation rack 50 to automatic conveyance vehicle 18 by lowering accommodation rack 50 downwards; however, the present disclosure is not particularly limited thereto as long as accommodation rack 50 can be received and transferred accordingly. Additionally, automatic conveyance vehicle 18 is described as executing the receipt and transfer of accommodation rack 50 by entering lifting and lowering space 48; however, the present disclosure is not particularly limited thereto. For example, a configuration may be adopted in which a conveyor or the like is provided on any of the placement section of automatic conveyance vehicle 18 and receiving sections 42, 46, so that automatic conveyance vehicle 18 is stopped in front of frame exchanging unit 40 for receipt and transfer of accommodation rack 50.

In the embodiment described above, exchanging section 27 is described as being made into the rod structure installed on printing head 23 and having the abutting section; however, the present disclosure is not particularly limited thereto, and hence exchanging section 27 may be an independent mechanism installed on parts other than printing head 23. In addition, in the embodiment described above, exchanging section 27 is described as being made into the rod mechanism configured to be brought into engagement with frame 29; however, exchanging section 27 may be made into, for example, a conveyor mechanism for moving frame 29 including an exchangeable member with frame 29 placed thereon.

In the embodiment described above, printing control section 21 is described as outputting request information to management PC 60; however, the present disclosure is not limited thereto, and hence, this process may be omitted. In addition, management control section 61 is described as outputting the command to move accommodation rack 50 to warehouse area 15 or automatic conveyance vehicle 18 when it acquires request information; however, this process may be omitted. At this time, management control section 61 may be configured to output a movement instruction to the control PC in warehouse area 15 for display thereon. In addition, mounting system 10 is described as having automatic conveyance vehicle 18; however, the present disclosure is not particularly limited thereto, and hence, the operator may convey accommodation rack 50 with automatic conveyance vehicle 18 omitted. In the embodiment described above, warehouse area 15 is described as having arm robot 16 and the control PC; however, either of arm robot 16 and the control PC may be omitted.

Figure 7:
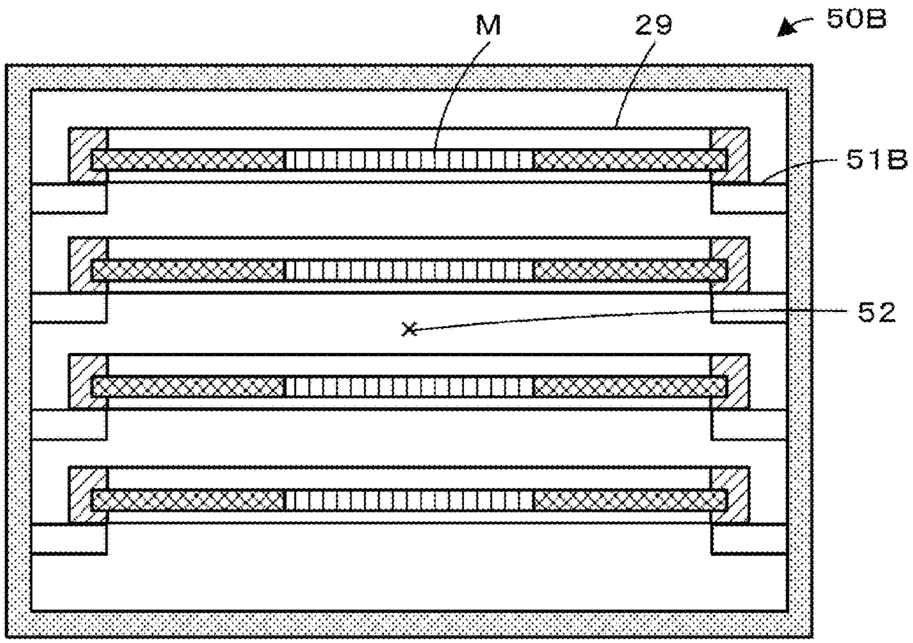
FIG. 7 is an explanatory diagram illustrating an example of another accommodation rack 50B.

In the embodiment described above, accommodation rack 50 is described as including shelf sections SI configured to accommodate frame 29 for placement therein; however, the present disclosure is not particularly limited thereto as long as accommodation rack 50 can accommodate multiple frames 29. FIG. 7 is an explanatory diagram showing an example of another type of accommodation rack 50B. This accommodation rack 50B includes shelf sections 51B provided on the left and right of an interior thereof so as to receive and support end portions of frame 29 inserted. With this accommodation rack 50B, the shelf sections 51 can be simplified more.

In the embodiment described above, accommodation rack 50 is described as having no driving section for moving frame 29; however, the present disclosure is not particularly limited thereto, and hence, accommodation rack 50 may have a driving section for moving frame 29.

In the embodiment described above, the exchangeable member is described as being screen mask M; however, the present disclosure is not limited thereto as long as the exchangeable member is a member needing to be exchanged, and hence the exchangeable member may be any one or more of parts other than screen mask M including cartridge 36 for accommodating the viscous fluid, squeegee 25, cleaning member 34 for use in cleaning screen mask M, support member 32 for supporting board S as the processing target, and the like. In addition, the processing target is described as being board S; the present disclosure is not particularly limited thereto as long as the processing target constitutes a member on which the viscous fluid is printed, and hence, the processing target may be a three-dimensional object or the like. In addition, the viscous fluid is described as being the solder paste; however, the viscous fluid may be a conductive paste, an adhesive, or the like.

In the embodiment described above, the present disclosure is described as being applied to printing device 11 including frame exchanging unit 40; however, the present disclosure is not particularly limited thereto, and hence, the present disclosure may be applied to frame exchanging unit 40. The same advantageous effect as that provided by the embodiment described above can also be provided by connecting frame exchanging unit 40 to printing device 11 in such a manner as to communicate therewith.

INDUSTRIAL APPLICABILITY

The present disclosure is applicable to the technical field of devices for use for a component mounting process.

REFERENCE SIGNS LIST

10 mounting system, 11 printing device, 12 printing system, 13 mounting device, 15 warehouse area, 16 arm robot, 17 preparation table, 18 automatic conveyance vehicle, 21 printing control section, 22 printing section, 23 printing head, 24 print moving section, 25 squeegee, 26 mask work section, 27 exchanging section, 28 mask fixing section, 29 frame, 30 board processing section, 31 board conveyance section, 32 support member, 33 cleaning section, 34 cleaning member, 35 supply section, 36 cartridge, 40 frame exchanging unit, 41 left unit (lifting and lowering section), 42 receiving section, 43 driving section, 45 right unit (lifting and lowering section), 46 receiving section, 47 driving section, 48 lifting and lowering space, 50 accommodation rack, 51 shelf section, 52 opening section, 60 management PC, 61 management control section, 62 storage section, 63 communication section, 140 storage device, A, B length, M screen mask, S board.

The invention claimed is:

1. A printing device comprising:

a printing section configured to execute a printing process of a viscous fluid on a processing target using a screen mask, the printing section including a print head;

a receiving section configured to receive an accommodation rack having multiple shelf sections for accommodating frames configured to support exchangeable members for a printing process that is executed at the printing section;

a lifting and lowering section configured to lift up and lower the accommodation rack;

an exchanging section configured to move one of the frames between a shelf section of the accommodation rack at a predetermined height and the printing section, the exchanging section including a conveyance rod disposed on the print head; and a controller configured to control the printing section, the lifting and lowering section, and the exchanging section, wherein the controller is configured to execute a receiving process in which the receiving section receives the accommodation rack from an automatic conveyance vehicle by controlling the lifting and lowering section to move to a lowermost position, and controlling the lifting and lowering section to be lifted upon receiving a receipt signal from the automatic conveyance vehicle that the accommodation rack is in a receiving position of the receiving section, wherein the controller is configured to execute a transfer process in which the accommodation rack is transferred from the receiving section to the automatic conveyance vehicle by controlling the lifting and lowering section to move to the lowermost position upon receiving a transfer signal from the automatic conveyance vehicle, and wherein the controller is configured to execute an exchanging process in which screen masks, which are the exchangeable members, are exchanged by controlling the lifting and lowering section to move the accommodation rack to position a vacant shelf section of the accommodation rack to an exchanging position, controlling the exchanging section to move a first screen mask, that has been used up, from the printing section to the vacant shelf section, controlling the lifting and lowering section to move the accommodation rack to position a shelf section of the accommodation rack including a second screen mask to the exchanging position, and controlling the exchanging section to move the second screen mask, from the shelf section to the printing section.

2. The printing device according to claim 1, wherein the lifting and lowering section is formed such that a length along a movement direction of the frame is shorter than a size of the accommodation rack.

3. The printing device according to claim 1, wherein the lifting and lowering section includes, as the receiving section, a left unit installed on a left side of a housing of the printing device and a right unit installed on a right side of the housing, and has a lifting and lowering space where the accommodation rack is lifted up and lowered at a center of the lifting and lowering section.

4. The printing device according to claim 1, wherein the multiple shelf sections of the accommodation rack enable frames supporting the exchangeable members to be placed in an up-down direction, and wherein the accommodation rack has an opening section configured to communicate with the printing section.

5. A printing system comprising:

the printing device according to claim 1; and a management device comprising a management control section configured to manage information on the printing device.

6. The printing system according to claim 5, wherein upon acquisition of request information for requesting a movement of the accommodation rack from the printing device, the management control section outputs a command to move the accommodation rack to the automatic conveyance vehicle for conveying the accommodation rack to and from the printing device.

* * * * *